United States Patent [19]

Fuhrman

[11] Patent Number: 4,739,205
[45] Date of Patent: Apr. 19, 1988

[54] TELEPHONE SIGNAL MULTIPLEXING SYSTEM

[75] Inventor: James L. Fuhrman, Tustin, Calif.

[73] Assignee: Rockwell International Corporation, El Segundo, Calif.

[21] Appl. No.: 832,613

[22] Filed: Feb. 24, 1986

[51] Int. Cl.[4] .............................................. H04J 3/02
[52] U.S. Cl. .................................... 370/85; 340/825.5
[58] Field of Search ..................... 370/85, 89, 13, 94; 340/825.5

[56] References Cited

U.S. PATENT DOCUMENTS

| | | | |
|---|---|---|---|
| 3,544,976 | 12/1970 | Collins | 340/172.5 |
| 3,790,717 | 2/1974 | Abramson et al. | 179/15 AL |
| 3,974,343 | 8/1976 | Cheney et al. | 179/18 ES |
| 4,139,737 | 2/1979 | Shimada et al. | 179/15 AL |
| 4,173,714 | 11/1979 | Bloch et al. | 179/99 R |
| 4,187,400 | 2/1980 | Ferrieu | 179/15 AA |
| 4,256,926 | 3/1981 | Pitroda et al. | 179/18 ES |
| 4,293,948 | 10/1981 | Soderblom | 370/90 |
| 4,301,531 | 11/1981 | Lubin | 370/62 |
| 4,347,601 | 8/1982 | Schmidt | 370/58 |
| 4,347,602 | 8/1982 | Kister et al. | 370/85 |
| 4,354,229 | 10/1982 | Davis et al. | 364/200 |
| 4,484,328 | 11/1984 | Schlarly | 370/85 |
| 4,500,989 | 2/1985 | Dahod | 370/85 |
| 4,542,501 | 9/1985 | Clevalet et al. | 370/85 |
| 4,594,705 | 6/1986 | Yahata et al. | 370/85 |

FOREIGN PATENT DOCUMENTS

1437031 5/1976 United Kingdom .
1437032 5/1976 United Kingdom .

Primary Examiner—Douglas W. Olms
Assistant Examiner—Frank M. Scutch, III
Attorney, Agent, or Firm—H. Fredrick Hamann; George A. Montanye; David J. Arthur

[57] ABSTRACT

A communications system includes self synchronizing device sets such as telephones that are interconnected by wiring to allow communication between the devices and communication with an outside communication line, such as a subscriber telephone line provided by a central telephone company. Each individual device includes access circuitry for placing signals on the interconnecting wires so that the signals from the various devices are time division multiplexed on the same wire conductors. The individual communication sets are synchronized without the intervention of a central controller. Each set is assigned a unique identification code. Each set then listens for the identification codes placed on the interconnection wiring by the other sets and places its signal on the wiring at the proper time in response to the other detected identification codes. The access circuitry may be constructed to use conventional four conductor telephone interconnection wiring so that the two conductors conventionally used for auxiliary, dial light power are also used for multiplexed signal transmissions.

7 Claims, 7 Drawing Sheets

TELEPHONE SIGNAL MULTIPLEXING SYSTEM

FIELD OF THE INVENTION

This invention relates generally to electronic communication circuitry, and pertains more particularly to a telephone signal multiplexing system for interconnecting telephone sets.

BACKGROUND OF THE INVENTION

Instant communication is rapidly becoming a virtually indispensable part of daily life, particularly in the conduct of business. Communication systems today carry both voice information and data to virtually any place on this planet. Through the international telephone system, a person can contact and carry on a conversation with another person thousands of miles away. Using either the international telephone system or dedicated communication lines, data can be transferred between widely separated computers or other electronic devices.

In many situations, a number of telephone sets or other communication devices are present at a single location. Besides having access to the outside telephone system, these devices should be able to communicate among themselves as an intercom, without needing to resort to the external system. A number of systems have been proposed to provide that dual capability.

The most common systems require a central processor or controller to coordinate the communications among the individual sets. Such central controllers tend to make these systems expensive, and may cause difficulties in adding or deleting individual sets from the system.

Another type of system that may include a central controller, or may be a peer-to-peer system with no central control, allows one set to establish communications with another, then preclude the use of the intercom line by the other units in the system. Priority may be based on which set dials up on the system first, or may be pre-established among the sets. These systems may include complicated control techniques to ensure priority is properly established. Data storage may need to be provided either in the lower-priority communication set or in the processor attached to that communication set to hold data until the intercom line is freed.

To provide simultaneous intercom communication between more than one pair of communication sets, other systems use a large number of conductors to connect the sets. Such systems obviously require extensive wiring at the location in which the system is located.

SUMMARY OF THE INVENTION

The communication system of this invention includes communication devices of substantially uniform construction that may be connected together and to an external communication line using cabling having relatively few conductors. The communication system may accomodate more than one outside communication line. The communication system of the invention may advantageously be used as a telephone system incorporating a plurality of telephone sets, which system can be connected to an external telephone line leading to the telephone company's central switching office. The telephone system may be operated using conventional four conductor cabling for interconnecting telephone sets inside a residence.

In the telephone system of this invention using four conductor cabling, the primary conductor pair is used for its conventional purpose of conveying to the user communications without modification, as from an outside telephone line. The auxiliary conductor pair in the interconnection cabling is used for its conventional purpose of conveying direct current power, but is also used for conveying multiplexed communications and control signals among the communications sets of the system. Each of the telephone sets may be assigned a fixed time slot in a time domain multiplexed embodiment of the invention. Alternatively, frequency division multiplexed channels may be provided for communications among the telephone sets of the system. In that alternative embodiment, one of the frequency division multiplexed channels may be used for the transfer of time domain multiplexed control data between the telephone sets.

Initialization controller circuitry is provided in each system device so that a telephone system may be reliably assembled and started, so that the system responds smoothly to power interruptions, so that additional telephone sets may be added to the system without modification to the previously used telephone sets, and so that telephone sets may be removed from the system or physically relocated within the system without disturbing overall system operation. The initialization controller circuitry in each telephone set causes that set to synchronize its time slot generation with the time of occurrence of time slots for all other telephone sets, and causes the production of an initial time slot by a telephone set by reference to a set identification code, which is unique to each telephone set.

The communication system of the invention includes a common communication line and a plurality of communication devices, such as telephone sets, connected to that line. Each communication device includes a time slot word generator and an initialization controller. The time slot word generator generates a time slot word signal that includes an identification code identifying that device, and applies the generated time slot word to the common communication line. The initialization controller causes the time slot word generator to apply its time slot word to the common communication line in response to a preceding time slot word, so the time slot words from the different communication devices are applied to the common line in a predetermined sequence.

The initialization controller preferably includes a time slot detector, an identification code reader and a comparator. The time slot detector senses the presence of a time slot word on the common line. The identification code reader determines the identification code of a sensed time slot word. The comparator compares the identification code of a sensed time slot word with the identification code of the device in which the initialization controller is included. Based on that comparison, the comparator also establishes a time for the time slot word generator to generate its time slot word so the device synchronizes its time slot word to the time slot words of the other devices on the system.

DETAILED DESCRIPTION OF THE PREFERRED EMBODIMENT

The communication system of the invention is described herein in its embodiment as a telephone communication system. Nevertheless, it will be apparent that other types of systems may include the present invention.

Figure 1:
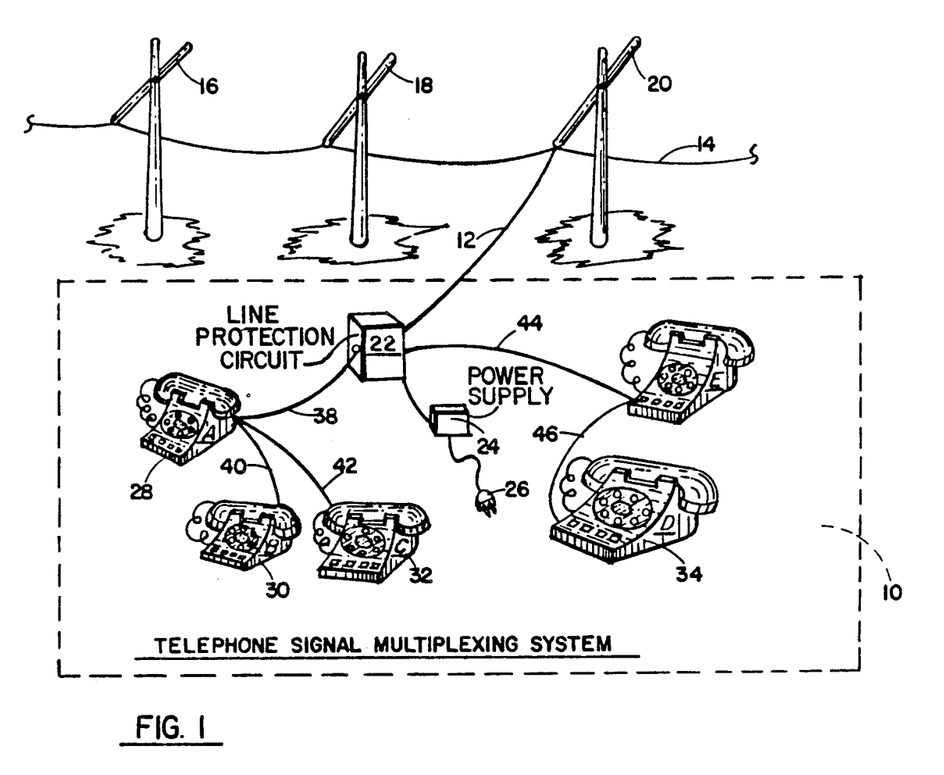
FIG. 1 is a symbolic, perspective drawing of the communication system of the invention as assembled as a telephone system with a connection to the telephone company subscriber distribution lines.

Referring first to FIG. 1, the communication system of the invention may be used as a telephone signal multiplexing system 10, which is connected to a drop wire 12 extending from the telephone company line 14. The telephone line 14 is typically suspended from telephone poles 16, 18, and 20. The telephone company subscriber line 14 is connected to the telephone company central office (not shown), where switching of the telephone signals occurs so that access is obtained to the existing international telephone system.

The telephone signal multiplexing system 10 includes a line protection box 22, which is preferably of conventional construction, and which prevents damage to the system 10 due to lightning or other spurious signals. The drop line 12 is preferably a four conductor cable of conventional construction, wherein a first conductor pair (termed a first line) may carry a first bi-directional signal path. The remaining two conductors of the drop line 12 are a second conductor pair (termed a second line), which is used as a second bi-directional signal path. In one embodiment of the invention, the drop line 12 uses its first and second conductor pairs to transfer independent voice conversations.

The protection box 22 may include conventional filtering or suppression circuitry to prevent multiplexed signals propagating from the system 10 onto the drop line 12. A power supply 24 may be connected to the protection box to produce DC power for operation of the system 10. The power supply 24 may be of conventional construction, as is used in providing dial light power in conventional residential telephone systems. The power supply 24 may be connected to a source of AC power (not shown) through the power plug 26.

The communication system 10 includes individual communication devices, such as telephone sets 28, 30, 32, 34, and 36, which are labeled with the letters A through E, respectively. The telephone sets 28-36 are preferably of uniform construction and are interconnected with the protection box 22 through the four conductor interconnection cables 38, 40, 42, 44 and 46.

Figure 2:
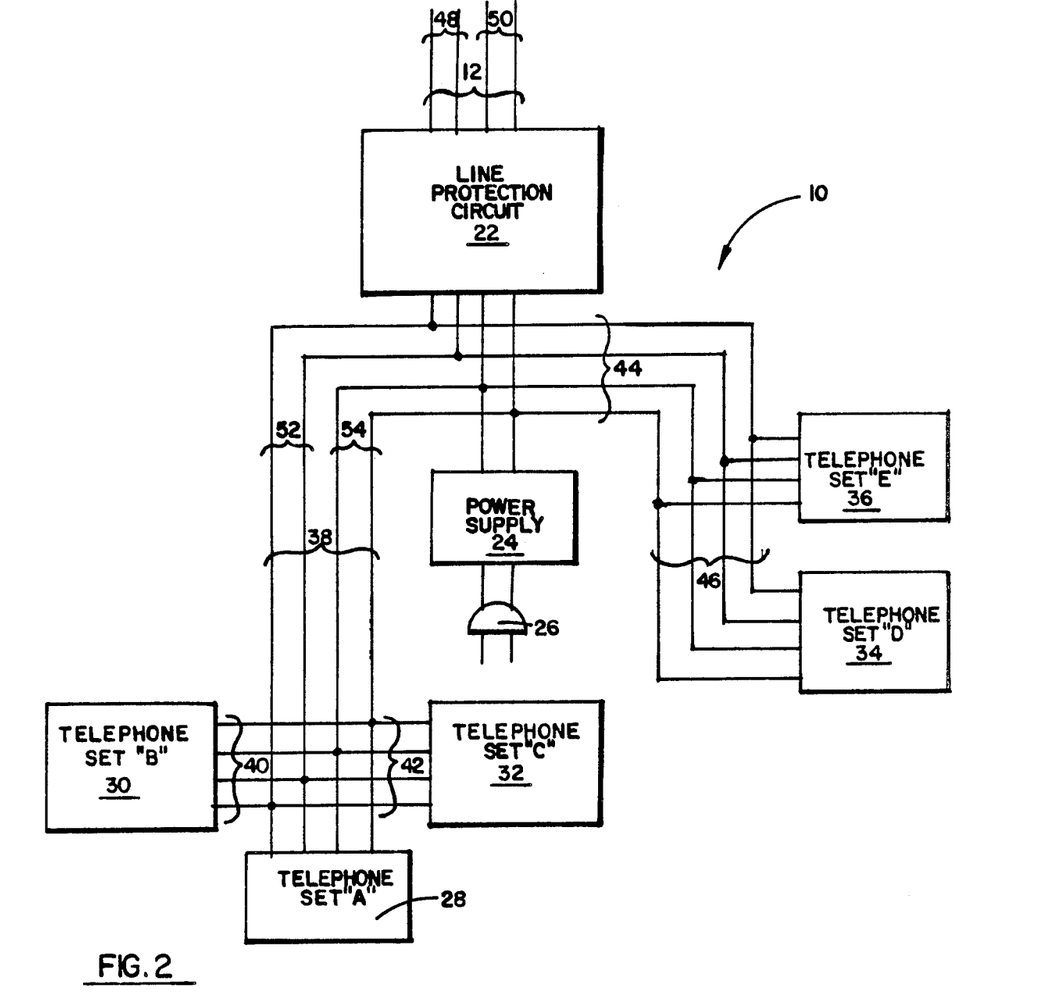
FIG. 2 is a block diagram of the telephone system shown in FIG. 1.

Referring next to the system block diagram of FIG. 2, the drop line 12 is separated into a first conductor pair or line 48, and a second conductor pair or line 50, as mentioned earlier. The subscriber lines 48 and 50 operate independently and are provided by the telephone company to establish two separate communications channels. Two pairs of electrically continuous, independent electrical conductors (pairs 52 and 54, respectively) are provided in the system 10. The interconnection pairs 52 and 54 extend through the cabling 38, 40, 42, 44 and 46.

The interconnection pair 52 is associated with the drop pair 48, and electrical connection is provided inside the protection circuit 22 between the pairs 48 and 52 so that conventional telephone communications may be passed between the pair 52 and the pair 48.

The interconnection pair 54 is associated with the drop pair 50 in a variation of the preferred embodiment of the invention, as discussed further below. In the preferred embodiment of the invention, the drop pair 50 of the telephone company line 12 is not used by the system 10 and there is no connection between the interconnection pair 54 and the drop pair 50.

The power supply 24 has its direct current outputs connected to the interconnection pair 54, as is conventional in residential telephones for providing dial light power to the individual telephone sets A–E.

Figure 3:
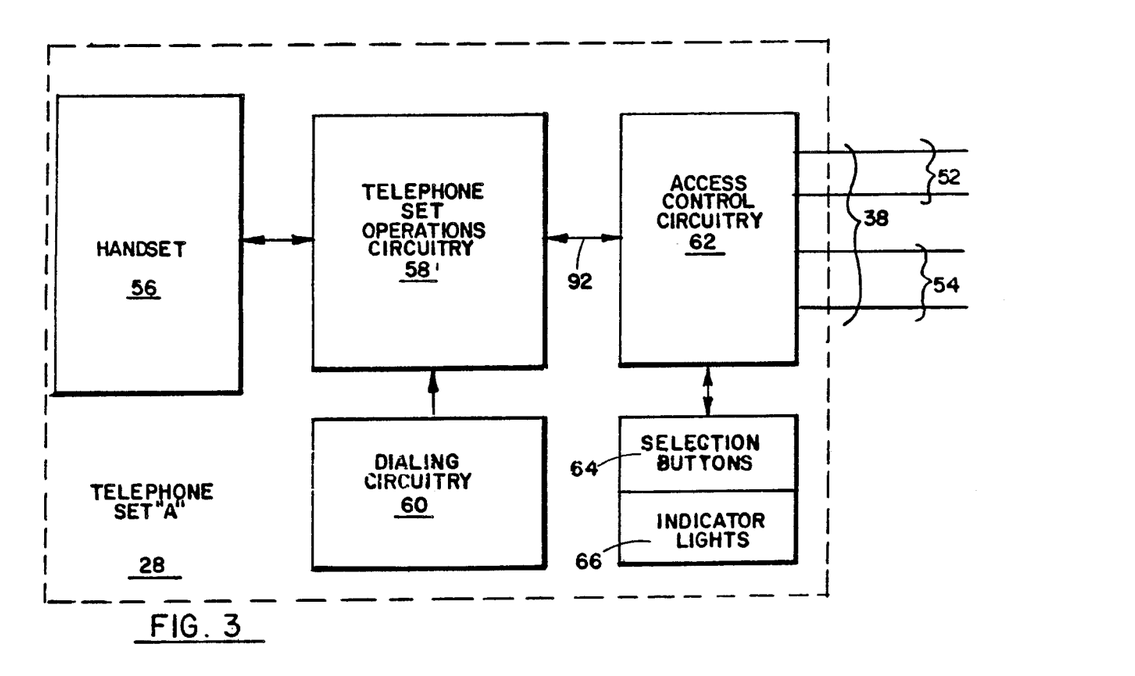
FIG. 3 is a block diagram of the electrical circuitry of a telephone set that may be used in the system of this invention.

Referring next to FIG. 3, the telephone set A (labeled 28) is typical of the telephone sets used in the telephone system 10 of this invention, all of which are preferably uniform in construction. The telephone set 28 includes a conventional hand set 56, conventional telephone set operations circuitry 58, and conventional dialing circuitry 60. The operations circuitry 58 is connected to the hand set 56 to allow the hand set 56 to produce and detect audio voice signals. The dialing circuitry 60 is connected to the operations circuitry 58 to allow telephone numbers to be dialed (i.e., using standard dial pulses or standard tone dialing).

Access control circuitry 62 is provided in the set 28 for connection to the conductor pairs 52 and 54 of the interconnection cable 38. The access control circuitry 62 is also connected to the operations circuitry 58 through the connecting link 92 so voice signals may be transferred back and forth between the operations circuitry 58 and the pairs 52 or 54, and in an appropriate signal format. That is, the access control circuitry 62 provides conventional audio voice signals to the circuitry 58, and acts to select, demultiplex, and decode the signals on the conductor pairs 52, 54.

The telephone set 28 includes selection buttons 64 and indicator lights 66, which allow selection between the pairs 52 and 54, and which allow the selection of various features of the telephone set 28, including "hold" features and intercom features. The selection buttons 64 are mechanically mounted on the telephone set 28 for manual operation by a user, and the indicator lights 66 are mounted on the telephone set 28 so that they may be visually seen by a user. The selection buttons 64 and indicator lights 66 are electrically connected to the access control circuitry 62 so that operation of the circuitry 62 is controlled and appropriate signals are placed on the interconnection conductor pairs 52 and 54.

Figure 4:
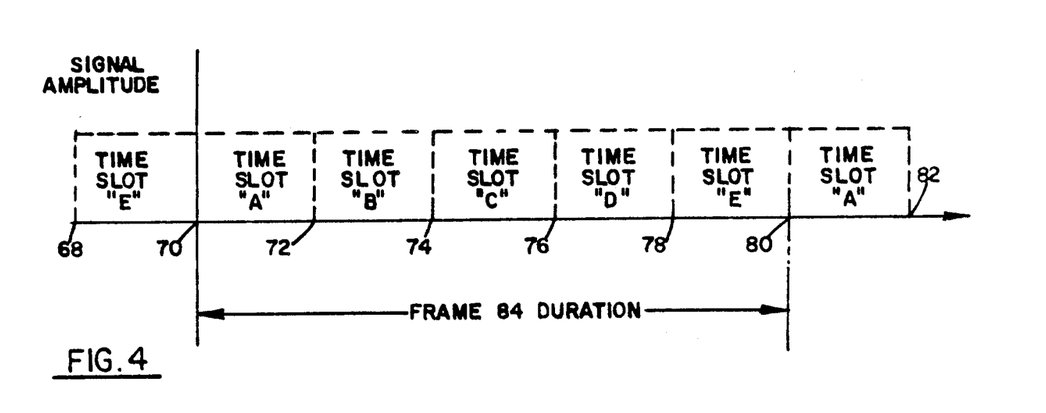
FIG. 4 is a timing diagram for the preferred, time division multiplexed embodiment of the invention.

Referring next to FIG. 4, the preferred embodiment of the invention uses a time division multiplexing operation having a fixed frame duration, a preassigned time slot for each telephone set, and which is non-blocking. A feature of the invention is that no central controller or timing source is required. Each of the individual telephone sets synchronizes itself to the operation of each of the other telephone sets, as is described in greater detail below.

As shown in FIG. 4, a time frame 84 of the preferred embodiment extends between the times labeled 70 and 80. A time slot A, corresponding to the signals produced by the telephone set A, occurs between the times 70 and 72. Note that the sequence of time slots is repetitive so that another time slot A for the telephone set A (set 28) occurs between the times 80 and 82.

A time frame 84 in the preferred embodiment includes a time slot for each of the individual telephone sets in the telephone system 10. Time slot E extends between the times 68 and 70, time slot A extends between the times 70 and 72, time slot B extends between the times 72 and 74, time slot C extends between the times 74 and 76, time slot D extends between the times 76 and 78, time slot E extends between the times 78 and 80, and time slot A extends between the times 80 and 82. Note that in the drawing of FIG. 4, the repetitive nature of the time slot production is illustrated by the fact that time slot E is repeated starting at both the time 68 and the time 78, and time slot A is repeated starting at both the time 70 and the time 80. The time slots A–E correspond to the signals produced on the conductor pair 54 by the telephone sets A–E, respectively.

The length of the frame 84 is established based on the number of time slots to be included and the duration of each time slot. As will become apparent in the discussion of the self-synchronization procedure, when the system with its individual units is initially manufactured or programmed, the time frame 84 is set for the maximum number of devices that may be included in the system. Within that maximum number, sets may be readily added to and deleted from the system, without disturbing the operation of the other sets in the system and without affecting the duration of the time frame 84.

Figure 5:
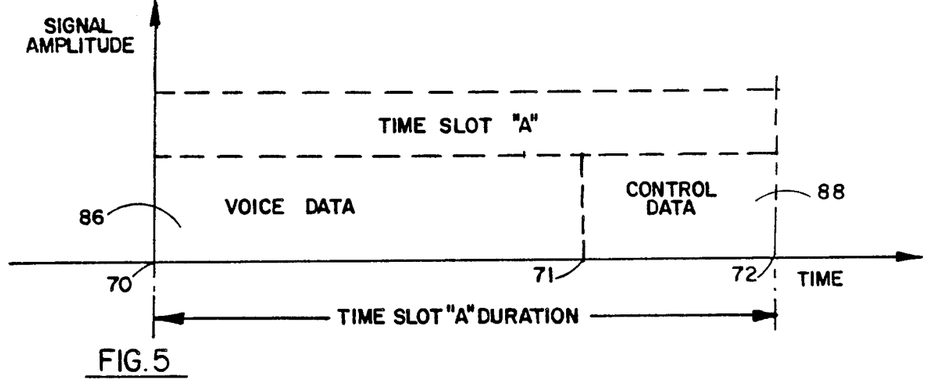
FIG. 5 is a timing diagram for an individual time slot from the timing diagram shown in FIG. 4.

Referring next to FIG. 5, the time slot A shown in greater detail is representative of the time slots A–E. The slot A includes digitally encoded voice data 86 and digital control data 88. The voice data 86 and control data 88 are preferably encoded onto the conductor pair 54 using conventional delayed modulation techniques. The voice data 86 is preferably placed inside the time slot A between the times 70 and 71. The control data 88 is preferably placed inside the time slot A between the times 71 and 72. The control data 88 is produced by the telephone set A, indicates identification or the ID code of the set and the status of the telephone set A (i.e., ringing, busy). The control data is also used for addressing intercom calls to others of the telephone sets (B–E) in the system 10.

Figure 6:
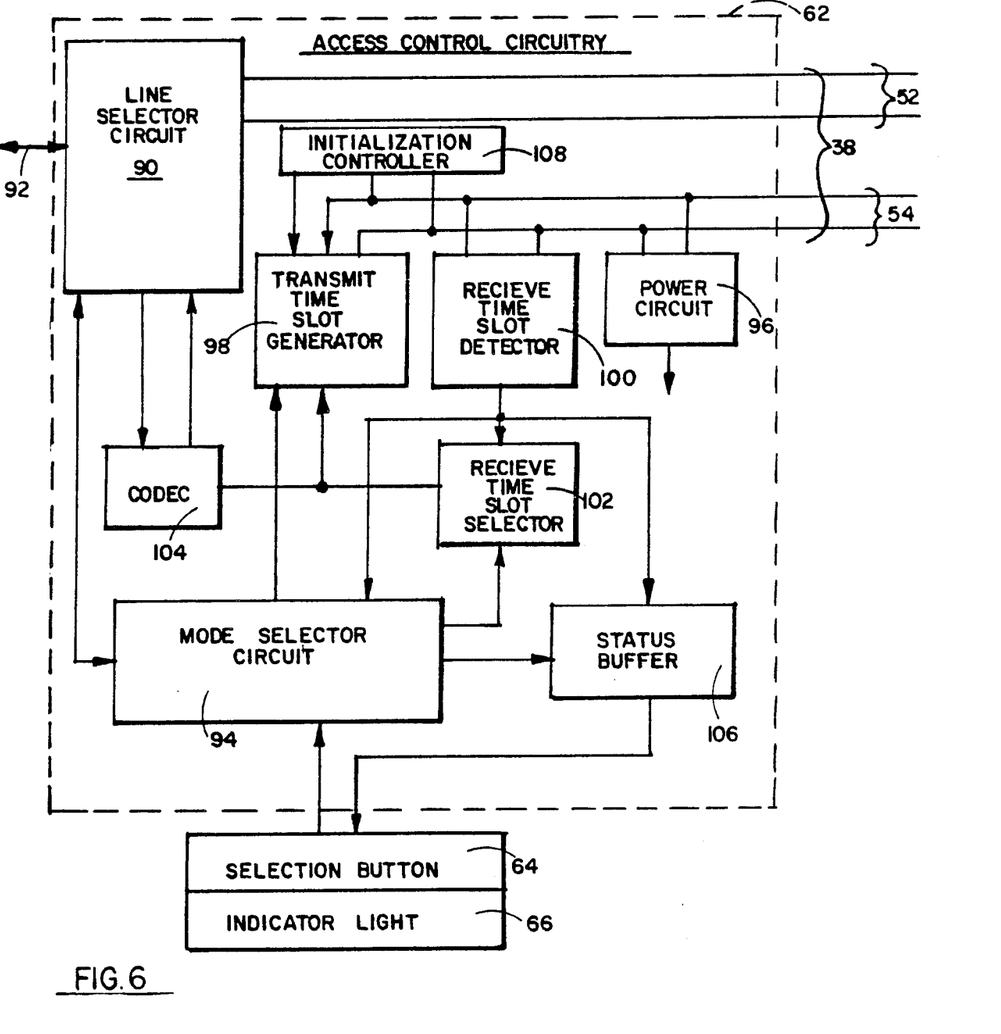
FIG. 6 is a block diagram of the access control circuitry of the device shown in FIG. 3, showing a preferred embodiment construction for the time domain multiplexed signal transmission embodiment of the system.

Referring next to FIG. 6, the access control circuitry 62 is preferably identical in overall construction in each of the telephone sets A–E of the system 10. While the access control circuitry 62 is shown in block diagram form for convenience in the description, a programmed processor may be used to perform the functions disclosed in the diagram. The circuitry 62 includes a line selector circuit 90, which selects between signals carried by the conductor pairs 52 and 54 to provide selective communication with the telephone set operation circuitry 58 (see FIG. 3) through the connecting link 92. The line selector circuit 90 operates under the control of a mode selector circuit 94 inside the access control circuitry 62, which provides for selection of central office lines, intercom lines, hold features, and other features which may be used inside the telephone set 28. The mode selector circuit 94 operates in response to manual selections made by the user who operates the selection buttons 64. Therefore, the selection buttons 64 are electrically connected to the mode selector circuit 94 to select the contents of the control data in time slot A (see FIG. 5). Also, the dialing circuitry 60 (see FIG. 3) sends dialing control information through the operations circuitry 58, line selector circuit 90, and mode selector 94 to place intercom call selection information in the control data 88.

The circuitry 62 is provided with a power tap circuit 96 connected to the conductor pair 54 to access the direct current power produced by the power supply 24 (see FIG. 2) and provide the direct current power for operating the telephone set 28.

The access control circuitry 62 includes a transmit time slot generator 98 and receive time slot detector 100. The time slot generator 98 produces the time slot A containing voice data 86 and control data 88 on command of the mode selector circuit 94. The receive time slot detector 100 receives and interprets the contents of each of the time slots produced on the conductor pair 54. The mode selector circuit 94 is connected to the output of the time slot detector 100 to sense the status of the sets B–E (by evaluating the control data 88 for each corresponding time slot) and to sense if set A is being called by intercom. A receive time slot selector 102 is also connected to the output of the detector 100 and operates under the control of the mode selector circuit 94 to selectively choose a time slot from the slots present on the conductor pair 54 for reception by the telephone set A.

The output of the time slot selector 102 is connected to a codec (coder/decoder) 104, which converts between audio signals (to the line selector circuit 90) and digitally encoded voice signals (from the time slot selector 102). The codec 104 is also connected to the input of the time slot generator 98 so that when instructed by the mode selector circuit 94, the generator 98 receives a digitally coded voice signal from the codec 104 and places the appropriate time slot contents on the conductor pair 54. The codec 104 is connected to the line selector circuit 90 so that when the circuit 90 is appropriately controlled by the mode selector circuit 94, signals are passed from the line 92 to the codec 104.

A status buffer 106 is connected to the output of the receive time slot detector 100 and to the output of the mode selector circuit 94 to control the operations of indicator light 66.

Figure 7:
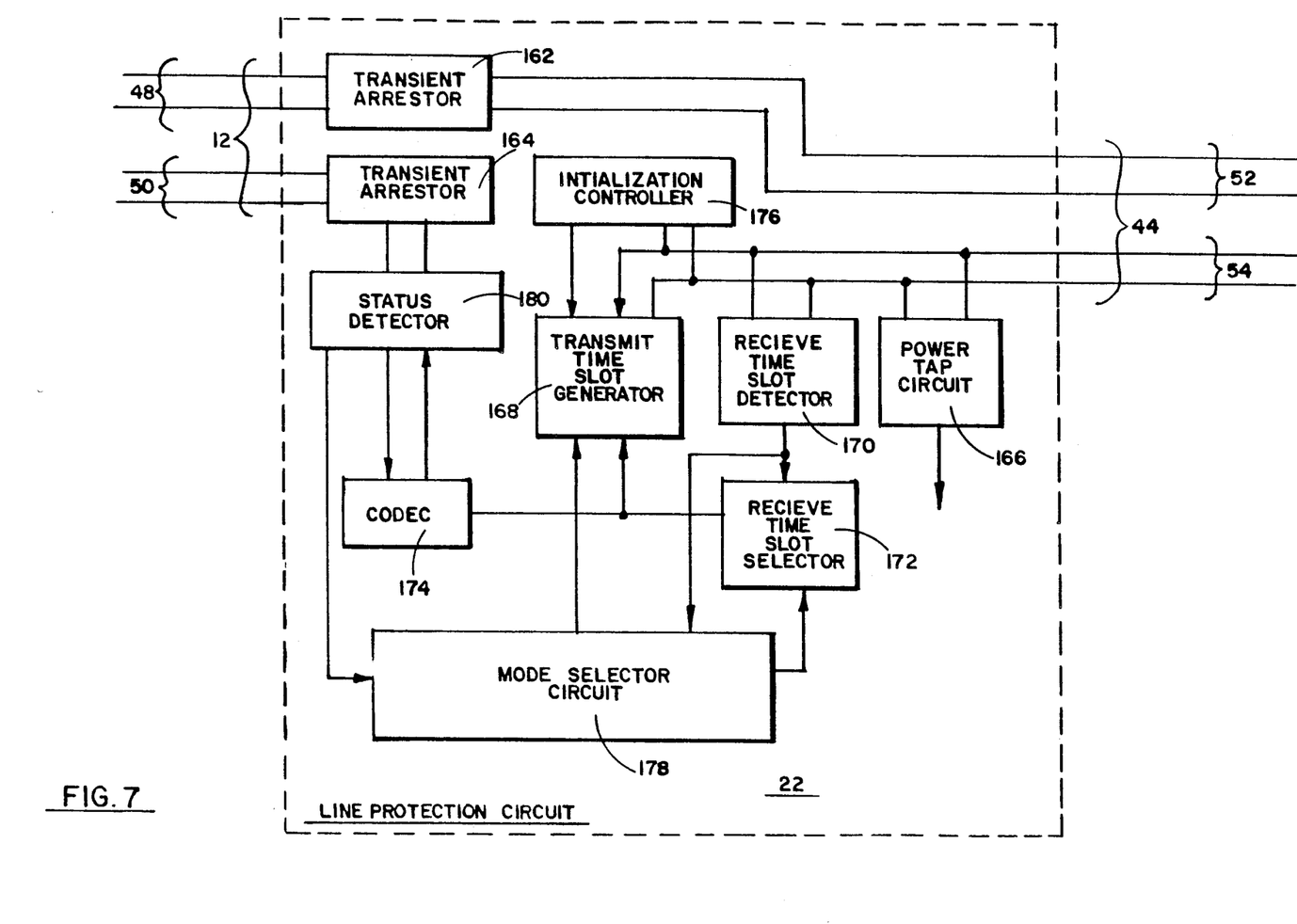
FIG. 7 is a block diagram of a variation of the preferred embodiment of the line protection circuit useful in the system of the invention.

Referring next to FIG. 7, a variation of the preferred embodiment of the line protection circuit 22 is shown. This variation of the preferred embodiment may be used when two external telephone communications lines are to be connected to the communication system 10. The second line is provided on the conductor pair 50 of the drop line 12 (FIG. 1). This variation is used with the alternative embodiment of the communication system of the invention, and is described below.

The preferred embodiment of line protection circuit 22 contains the structure shown in FIG. 7, except the structures connected between the line pair 50 and the line pair 54, all of which would be omitted so that there would be no connection between the drop pair 50 and the interconnection pair 54. Only a transient arrester 162 would be connected between the drop line pair 48 and the interconnection pair 52 to prevent noise signals (such as those due to lightning and the like) from damaging the telephone sets A-E.

OPERATION OF THE PREFERRED EMBODIMENT

The telephone set A may be operated to communicate with the central office line (conductor pair 52), or to act as an intercom with one of the other telephone sets in the system 10 through the time multiplexed signalling on the conductor pair 54. When the telephone set A is controlled through the selection buttons 64 to communicate with an outside line (the central office line present on the conductor pair 52), the telephone set A behaves in much the same way as a conventional telephone set.

When the selection buttons 64 are appropriately operated by the user, the telephone set A may be used to place an intercom call to any of the other telephone sets B-E in the system 10. Such an intercom call is placed using the set A by placing appropriate information in the control data 88 of the time slot A. The time slot A is placed on the line 54 by the transmit time slot generator 98. Each of the other telephone sets in the telephone system 10 is continuously monitoring, through its receive time slot detector 100, the contents of each of the time slots. When the signal in the control data 88 of time slot A is noticed by the telephone set being called, it rings in response to the control data 88. When the telephone set being called goes off-hook (i.e., the user of the called set picks up his handset), then the station being called begins to place appropriate voice data in its time slot (similar to the voice data 86 in time slot A through its transmit time slot generator 98). The receive time slot selector 102 of telephone set A operates to selectively receive the time slot corresponding to the telephone set being called, and the receive time slot selector 102 of the telephone set being called operates to selectively receive the time slot A. Thus, a two way conversation may ensue between telephone set A and the station being called.

The initialization controller 108 of the access control circuitry 62 shown in FIG. 6 is connected to sense the condition of the conductor pair 54 and to control the operation of the transmit time slot generator 98. The initialization controller 108 provides power-up synchronization and relative synchronization of the time slot produced by the telephone set A to the time slots produced by the other sets in the system 10. The initialization controller 108 senses the presence of time slot signals on the line 54 produced by telephone sets other than set A, and causes the generator 98 to produce a time slot in the proper time synchronization after a preceding time slot is received on the line 54. For example, the initialization controller 108 detects when a time slot E has been produced (such as between the times 68 and 70 in FIG. 4) and then produces a time slot A after the time slot E (such as between the times 70 and 72 in FIG. 4).

The initialization controller 108 is provided with a set identification code. Each of the telephone sets A-E of the system 10 has a different identification code uniquely assigned to it, and no two of the telephone sets in the system 10 have the same identification code. The identification code is used by the initialization controller 108 to determine a time delay period after the sensing of DC power on the line 54, so that an initial time slot may be produced by the time slot generator 98 after the appropriate delay period (corresponding to the identification code) is produced by the controller 108. The identification code is also used by the initialization controller 108 to establish a delay time following the detection of another set's identification code on the line 54 for the time slot that is synchronized with preceding time slots.

Providing a different identification code to each of the telephone sets in the system 10 ensures that no more than one of the sets produces an initial time slot generator at a time, and conflict between the telephone sets is avoided. The telephone set having an identification code corresponding to the shortest delay period will produce an initial time slot signal before any of the remaining telephone sets, and the remaining telephone sets will synchronize themselves with the time slot signal produced by the first telephone set.

This system of providing a unique identification code to each of the telephone sets so that they may each have a different initial delay period for the production of an initial time slot signal and for synchronizing the generation of time slots to time slots already on the line ensures that telephone sets may be readily added to an existing system 10, up to the maximum for which the system is designed, without making modifications to the telephone sets which were already a part of the system 10. This identification code assignment technique also ensures that the system 10 will remain operating satisfactorily even though one or more of the existing telephone sets in the system 10 may cease operating or be removed. The identification code technique allows the system 10 to function without a central timer or controller, since each telephone sets cooperatively synchronizes itself to the other telephone sets.

Figure 9:
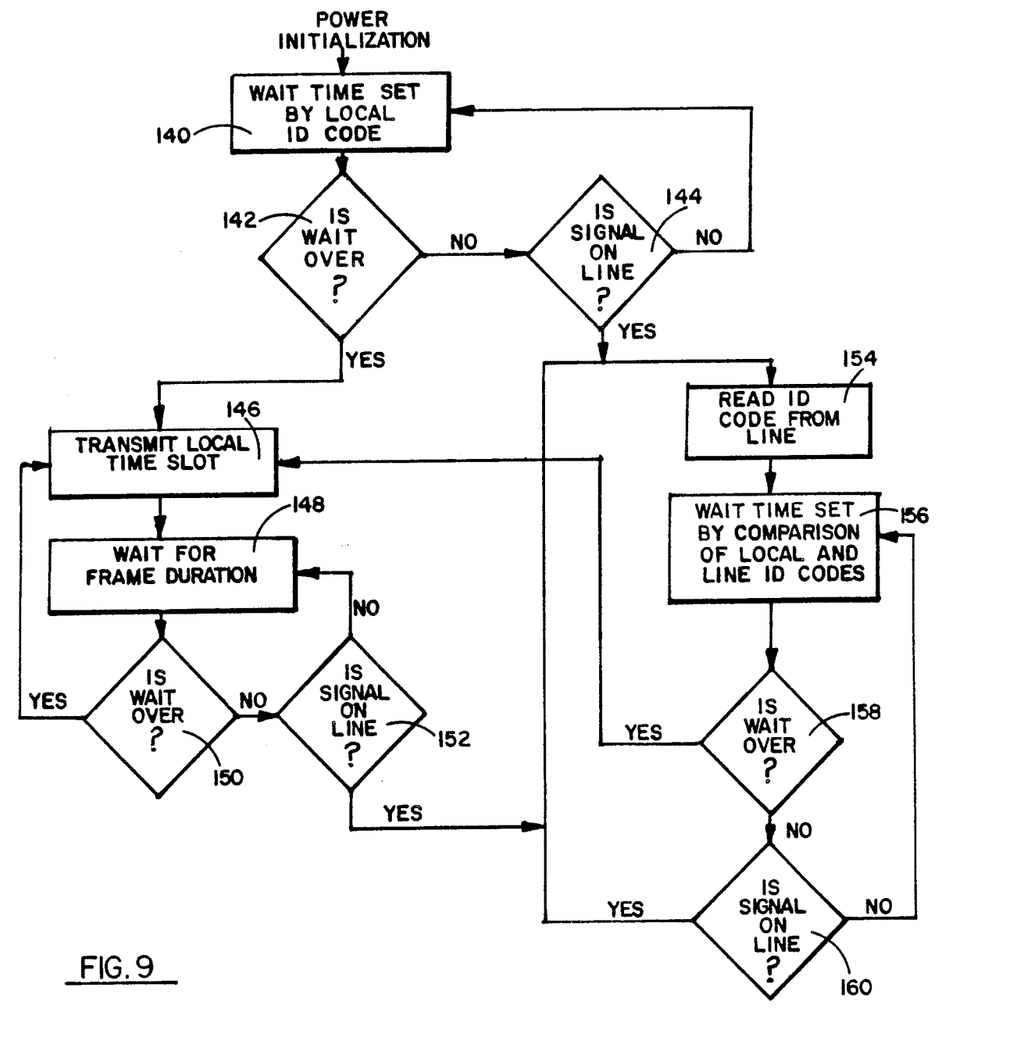
FIG. 9 is a flow chart diagram showing the time slot self synchronization operation for an individual communication device of the invention.

Referring next to FIG. 9, a flow chart for the initialization process performed by the initialization controller 108 of FIG. 6 to control the time when the circuitry 62 places a time slot on the line pair 54 is shown. The procedure of FIG. 9 is ideally embodied in a program that is included in the initialization controller 108. The controller 108 uses the process of FIG. 9 to determine the times when the generator 98 is to produce time slots after power initialization, after reception of time slot signals on the line pair 54, and for the production of time slots on a recurring basis with a period equal to the frame duration time. The process of FIG. 9 is used by the controller 108 to sense power initialization (i.e., when power is initially applied to the line pair 54 and received by the tap circuit 96) and to monitor the status of signals on the line pair 54.

Referring to FIG. 9, after power initialization, a wait routine 140 is entered, which sets a waiting time, the length of which is dependent on the local ID code (i.e., the identification code of the particular device in which the initialization controller 108 is included). Thus, the waiting time of the routine 140 is different for each of the devices coupled to the line pair 54, since each device has a different ID code. Note that an initialization controller corresponding to the initialization controller 108 is included in each device connected to the line pair 54, including each of the telephone sets and, for the variation in the preferred embodiment, the line protection circuit 22.

After the initial waiting time is set by the routine 140, the decision routines 142 and 144 serve to repetitively check whether the initial waiting time has expired or whether a signal from another device has been detected on the line 54, respectively. The decision routine 144 senses if another device in the system 10 (such as another telephone set) has placed its time slot on the line pair 54 prior to the time that the waiting time set by the function 140 has expired.

If the initial waiting time set by the wait time routine 140 has expired prior to any other signal being detected on the line 54 by the routine 144, the local time slot transmission routine 146 is used to transmit a time slot onto the line 54. After the routine 146 transmits a time slot, a wait time set routine 148 is used to set a waiting time equal to the frame duration, so that time slots may be produced repetitively with a repetition rate set by a standard frame duration. The frame duration is set based on the time slot duration and the number of time slots the system is to be capable of accommodating.

The decision routines 150 and 152 are used to detect whether the frame duration waiting period has expired and whether another time slot signal from another device (i.e., another telephone set) has appeared on the line 54, respectively. If the routine 150 detects that the frame duration waiting time has expired, then the routine 146 is used to transmit another time slot on the line 54, which will occur a standard frame duration after the time slot signal which was previously produced. If the routine 152 detects another signal on the line 54, then the routine 154 is used to sense the ID code from the time slot just detected.

If either of the detection routines 144, 152 detects another signal on the line 54, the read routine 154 determines the ID code of the device that generated that time slot. The ID code is carried in the control data section of the time slot, such as the control data slot 88 (FIG. 5) for the time slot A generated by the telephone set A.

Another wait time setting routine 156 follows the read routine 154 for comparing the identification code just sensed by the routine 154 on the line 54 and the local identification code of the device in which the program of FIG. 9 is being used. The comparison and wait routine 156 allows a device (such as a telephone set) to synchronize itself to the presence of time slot signals produced by other devices (such as other telephone sets) in the system. The comparison of routine 156 determines how long a synchronization time delay should be used by following receipt of an ID code on the line 54 to produce a time slot (by the routine 146) that does not overlap other time slots being produced on the line 54, but that insures that time slots will be repetitively produced by each of the devices connected to the line pair 54.

The proper waiting time is determined in the routine 156 based on the relative positions of the detected time slot and the local time slot in the predetermined time slot sequence. For example, referring to the timing diagram of FIG. 4, the telephone set D, after sensing the time slot A, will set a waiting time in the routine 156 equal to the difference between the time 72 and the time 76.

The decision routines 158 and 160 are used after the routine 156 to detect whether the synchronization waiting time set by routine 156 has expired (in routine 158), and whether another time slot signal (from another device) has been detected (by the routine 160) on the line pair 54. If the routine 158 detects that the waiting time set by the routine 156 has expired, then the transmit routine 146 is used to transmit a time slot on the line pair 54. If the routine 160 detects the presence of another time slot signal on the line 54, then the routine 154 is used to sense the identification code of the time slot signal just detected. After the read routine 154 has determined the ID code of the just detected time slot, the wait time routine 156 recomputes the time delay and again enters the decision routines 158, 160. Returning again to the example mentioned above, if the telephone set D, after setting a wait time after detecting the time slot A, then detects the time slot B, the routine 156 recomputes the wait time to equal the difference between the time 74 and the time 76.

The use of a waiting period set by a device identification code in routine 140 and the decision routines 142 and 144 allow devices to assert themselves on the line pair 54 in a priority sequence determined by the relative magnitudes of the identification codes, so that the particular device having the highest priority identification code will place its time slot on the line 54 first, and the remaining, lower priority, devices will synchronize themselves to the highest priority device. The method of comparing an ID code read from the line 54 with a local ID code (in the device), then setting a wait time in the routine 156 based on that comparison, allows the telephone sets A–E to operate independently and to be readily added to or removed from the system 10 without disturbing the overall operation of the system.

The wait period provided by the routine 156 and the decision routines 158 and 160 allows each device (such as a telephone set or the line protection circuit 22 in the preferred embodiment variation) to synchronize itself to every other device connected to the line pair 54. If all the potential devices or telephones of the system are connected, then each unit will apply its time slot in sequence. If one or more devices is removed from the system or is not functioning, a blank space will appear where the "missing" time slot would otherwise appear, but the other sets will continue to operate normally. For example, if the telephone C is not connected in the system, no time slot C will be generated, so there will be no signal on the line 54 between the time 74 and the time 76. As the routine 156 of the telephone D previously set, in response to the time slot B, a wait time equal to the time between times 74 and 76, the telephone D will transmit its local time slot D at time 76 even though time slot C appeared. If then telephone C is connected to the system, it listens for the other time slots and fits its time slot in the proper time, without disrupting the generation of the other time slots.

DESCRIPTION OF AN ALTERNATIVE EMBODIMENT

Figure 10:
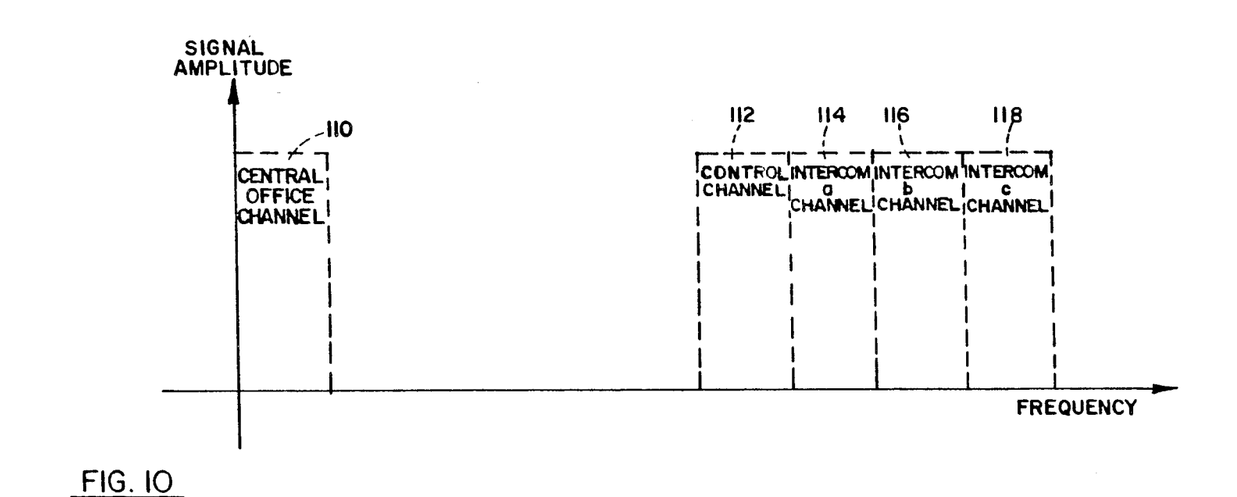
FIG. 10 is a frequency allocation diagram showing the relationship between signal amplitude and frequency for the alternative, frequency domain multiplexed embodiment of the invention.

An alternative frequency division multiplexed telephone system may be constructed using the structures used in FIGS. 1–3 together with the frequency spectrum allocation shown in FIG. 10. In this alternative embodiment, a first central telephone office line is provided on the conductor pair 48 and a second central telephone office line is provided on the conductor pair 50 (see FIG. 2). The interconnection conductor pair 52 corresponds to the drop pair 48, and both carry voice band signals for the first central office line. The interconnection pair 54 corresponds to the drop line pair 50, and both carry voice band signals for the second central office line. Also, the pair 54 shown in FIG. 2 is provided with frequency division multiplexed signals for intercom and control signalling among the telephone sets A–E of the system 10. The line protection circuit box 22 may be equipped with conventional filters to prevent the signals at frequencies above the voice band from propagating back along the drop line 12.

This alternative embodiment of the communication system 10 of the invention includes the line protection circuit shown in FIG. 7. The structures between the line pairs 50 and 54 are provided to make the telephone central office line connected to the pair 50 available to the telephone sets connected to the line pair 54.

The line protection circuit 22 includes a transient arrestor 164 connected between the line pair 50 and the line pair 54 to prevent noise signals (such as those due to lightning and the like) from damaging the telephone sets A–E.

A power tap circuit 166, a transmit time slot generator 168, a receive time slot detector 170, a receive time slot selector 172, a codec 174, and an initialization controller 176 perform functions similar to those performed by the corresponding parts of the access control circuitry shown in FIG. 6, namely, the power tap circuit 96, the transmit time slot generator 98, the receive time slot detector 100, receive time slot selector 102, the codec 104, and the initialization controller 108.

A mode selector circuit 178 controls the time slot generator 168 and the receive time slot selector 172 in response to the detector 170 and a status detector 180, which monitors the status of the telephone line 50 (i.e., whether an incoming call on the line 50 is causing "ringing").

The circuitry of the line protection circuit 22 shown in FIG. 7 allows the circuit 22 to behave in much the same way as the circuitry of each of the telephone sets A–E, insofar as telephone signals on the line 50 are transformed into time domain multiplexed signals on the line 54. The transfer of signals between the line 50 and a telephone set connected to the line 54 is similar to the transfer of intercom signals between two telephone sets connected to the line 54.

Figure 8:
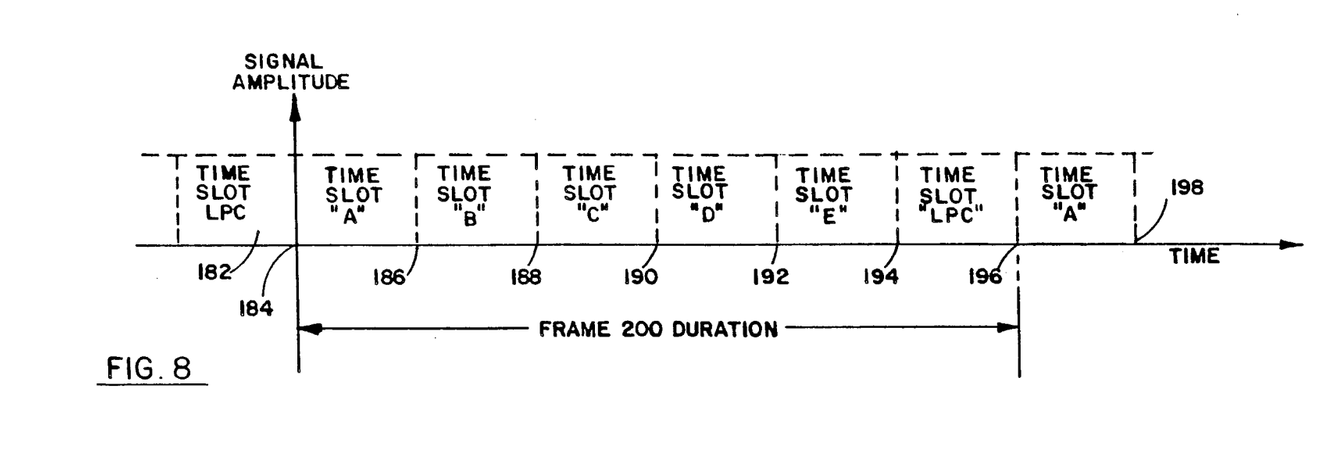
FIG. 8 is a timing diagram for the variation of the preferred embodiment of the invention.

Referring next to FIG. 8, the arrangement of time slots in the variation to the preferred embodiment is similar to the arrangement shown in FIG. 4, excepting that a time slot LPC for the line protection circuit 22 is placed between the time slot E and the time slot A. The arrangement of time slots shown in FIG. 8 represents the time multiplexed transmission made on the line 54 shown in FIG. 7. Another time slot LPC occurs between the times 182 and 184 and is followed by a time slot A occurring between times 184 and 186. Time slots B–E occur following the time slot A at the times 186, 188, 190, and 192, respectively. A time slot LPC between the times 194 and 196 occurs following the time slot E. Another time slot A occurs between the times 196 and 198, following the time slot LPC that occurred at time 194. The sequence of time slots repeats itself with a period equal to the duration of the frame 200.

Referring next to FIG. 10, a frequency spectrum allocation is shown for the signals present on the interconnection pair 54. As mentioned above, a voice band channel 110 is provided for transmitting signals to and from the central office line present on the drop pair 50. A control frequency channel 112 is provided for transferring control data among the telephone sets of the system 10. It is preferable that the control channel 112 be time domain multiplexed in much the same way as is shown in FIG. 4. However, the control channel 112 includes only control data (similar to control data 88 shown in FIG. 5) and does not include any digitally encoded voice data. Therefore, the bit rate required for the control channel 112 in the alternative embodiment is significantly less than the bit rate required for transmission on the conductor pair 54 in the preferred embodiment.

A plurality of intercom frequency channels 114, 116, and 118 (labeled Intercom a, b, and c, respectively) are provided for intercom voice communications between telephone sets in the system 10. It is preferable that the channels 114, 116 and 118 be amplitude modulated analog signals so that signal addition by super-position may occur for telephone conferencing. That is, bi-directional communications may occur on the frequency channel 114 (for example) if two telephone sets both transmit amplitude modulated voice signals on carriers on the channel 114 so that the transmissions add so that both telephone sets receive the same superimposed signals. Conferencing occurs in this approach by allowing signals from more than two telephone sets to be superimposed on the same frequency channel. This approach of super-position has some parallel in conventional telephone systems wherein if more than one party to a conversation talks at the same time, both signals propagate and add together.

Using this alternative embodiment frequency division multiplex technique, the control channel 112 must carry information concerning the status of each telephone set, the identity of telephone sets being called, and which of the telephone sets are using which of the intercom channel frequencies 114, 116, 118, the central office channel frequency 110, and the central office line on the conductor pair 52.

Figure 11:
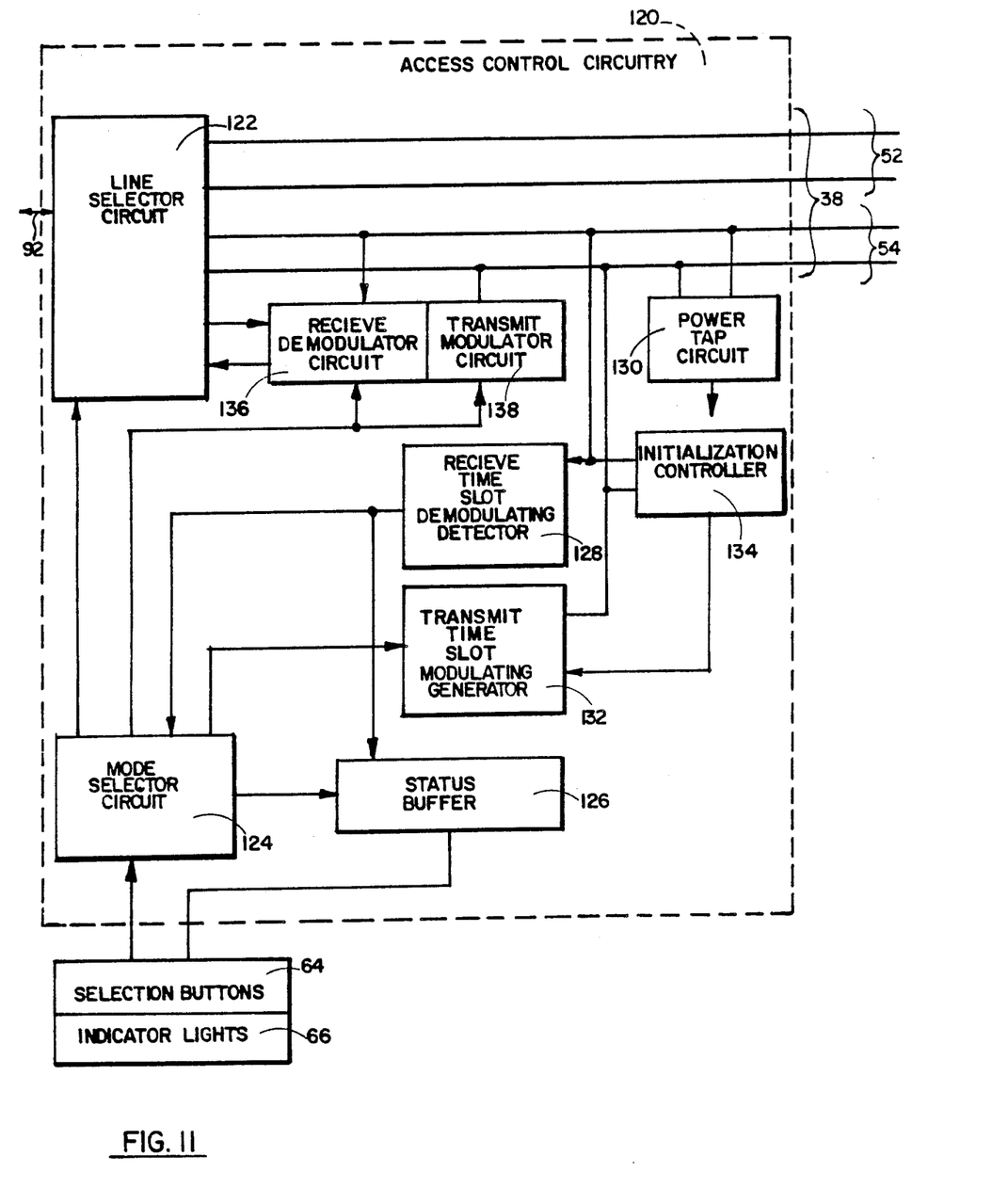
FIG. 11 is a block diagram of the access control circuitry of the device shown in FIG. 3 for the alternative, frequency domain multiplexed embodiment.

Referring next to FIG. 11, the access control circuitry 120 shown is an alternative to the access control circuitry 62 shown in FIG. 3. The access control circuitry 120 includes a line selector circuit 122 for selecting between the channel provided on the interconnection pair 52 and the various channels provided on the interconnection pair 54. The line selector circuit 122 operates in response to a mode selector circuit 124 in the circuitry 120. Operation of the mode selector circuit 124 is in response to the manual selection by a user of the selection buttons 64. A status buffer 126 controls the indicator light 66 in response to information obtained from the mode selector circuit 124 and a receive time slot demodulating detector 128.

A power tap circuit 130 is connected to the interconnection pair 54 for receiving direct current power from the power supply 24 and for providing direct current power to the telephone set for operation of the circuitry therein.

The receive time slot demodulating detector 128 is connected to the interconnection pair 54 for receiving the information transmitted in the control channel 112 (see FIG. 10) so that the individual time slots in the channel 112 are received by the circuitry 120. The control data received by the detector 128 is provided to the mode selector circuit 124 for controlling the operation of the circuitry 120 and is provided to the status buffer 126 for controlling the indicator lights 66.

A transmit time slot modulating generator 132 is connected to an output of the mode selector circuit 124 so that appropriate control data reflecting the status of the telephone set A may be placed in an appropriate time slot of the channel 112. An initialization controller 134 is connected to the generator 132 for controlling the synchronization and power-up initialization of time slot production in much the same way that the initialization controller 108 operates in the embodiment shown in FIG. 6. As with the preferred embodiment, the initialization controller 134 is provided with a unique telephone set identification code so that appropriate synchronization and initialization may occur.

A receive demodulator circuit 136 and a transmit modulator circuit 138 are provided so that communications by the telephone set may occur in any of the intercom frequency channels 114, 116, or 118 upon command of the mode selector circuit 124.

OPERATION OF THE ALTERNATIVE EMBODIMENT

Operation of the telephone sets in the system 10 with the alternative embodiment access control circuitry 120 proceeds in a conventional manner when voice band communications occur on the interconnection pair 52 or through the central office channel 110 of the interconnection pair 54. The control channel 112 is used to provide status information regarding each of the telephone sets in the system 10 so that every set is aware of the usage of the various channels (line 52, and channels 110, 114, 116, and 118) and the status of each of the individual telephone sets A-E. One of the telephone sets may make an intercom call to another of the telephone sets by placing the appropriate information in the calling set time slot of channel 112 so that when the called station responds by placing appropriate data in the time slot for the called telephone set, a conversation may ensue. The intercom conversation ensues by both the called and the calling telephone sets adjusting both receive demodulator circuits (such as circuit 136) and both transmit modulator circuits (such as circuit 138) to the same intercom frequency channel (i.e., one of the channels 114, 116, or 118).

The relative synchronization and initialization of time slot production for the control channel 112 proceeds in the alternative embodiment in essentially the same way as the similar operations proceed with the preferred embodiment.

I claim:

1. A communication device having a local identification code and for connection to a common time domain multiplexed line, said device comprising:
   a time slot generator for producing a transmitted time slot word, with said transmitted time slot word including said local identification code; and
   an initialization controller for causing said time slot generator to transmit said time slot word at a predetermined time in response to a preceding time slot word so that a plurality of said communication devices connected to said common line transmit their time slot words in a predetermined sequence, wherein said initialization controller comprises:
   a time slot detector for sensing the presence of a time slot word on said line;
   an identification code reader for determining the identification code of a sensed time slot word;
   a comparator for comparing the identification code of a sensed time slot word with said local identification code to produce a difference indicator code; and
   a time delay actuator responsive to said difference indicator for controlling said time slot generator so that the transmitted time slot word is produced thereby at a time delay corresponding to the magnitude of said difference indicator after the sensing of the other time slot word on said line.

2. The communication device of claim 1 further comprising a power-up detector for detecting when power is initially supplied to said device, wherein said time delay actuator is responsive to said power-up detector for controlling said time slot generator so that the transmitted time slot word is produced thereby at a time delay having a duration corresponding to the magnitude of said local identification code after said power-up detector detects that power is supplied to said device.

3. A method for communicating information among a plurality of devices connected to a common communication line, the method comprising:
   generating in each device a time slot word including local identification code;
   applying said time slot words to said common communication line in a predetermined ordered sequence, wherein each time slot word is applied by its corresponding device at a predetermined time in response to a preceding time slot word, so that each device independently synchronizes itself to the sequence of time slots on said common line; and
   the method further comprising in each device:
   detecting the presence of a time slot word on said common line;
   reading the indentification code of said sensed time slot word;
   comparing the identification code of said sensed time slot word with said local identification code and producing a difference indicator representative of the difference between the identification code of said sensed time slot word and said local identification code; and
   delaying the application of said time slot word to said common line by a time delay corresponding to the magnitude of said difference indicator.

4. A method for communicating information among a plurality of devices connected to a common communication line, the method comprising:
   generating in each device a time slot word including its local identification code;
   applying said time slot words to said common communication line in a predetermined ordered sequence, wherein each time slot word is applied by its corresponding device at a predetermined time in response to a preceding time slot word, so that each device independently synchronizes itself to the sequence of time slots on said common line;
   in each device detecting when power is initially supplied to said device; and
   in each device delaying the application of said time slot word to said common line by a time delay corresponding to the magnitude of said local identification code following detection that power is supplied to said device.

5. In a method for time domain multiplexing a plurality of telephone sets connected to a common line, the steps of:
   assigning an initialization identifier to each of the telephone sets, wherein each initialization identifier has a unique magnitude;
   forming a time slot word for each telephone set;

applying the time slot word from the telephone set with the smallest initialization identifier to the common line after initialization; and applying the time slot words from the other telephone sets to said common line in a predetermined ordered sequence, with the order of the sequence determined by the relative magnitudes of the initialization identifiers, wherein each time slot word is supplied in order by its corresponding telephone set in response to a preceding time slot word.

6. The method of claim 5 wherein the step of applying said time slot words to said common line in a predetermined ordered sequence comprises, in each telephone set, the steps of:

detecting the presence of a time slot word on said common line;

determining the initialization identifier of said sensed time slot word;

comparing the initialization identifier of said sensed time slot with the initialization identifier of the local telephone set;

applying the time slot word of the local telephone set to said common line at a predetermined time after detecting said time slot word on said common line, wherein said predetermined time corresponds to the difference between the initialization identifier of the detected time slot word and the local initialization identifier.

7. A method of self-synchronization for a device coupled to a time domain multiplexed line, wherein the device has a unique local identification code, the method comprising the steps of:

(a) detecting a power-up initialization of said device;

(b) setting a power-up waiting time corresponding to the magnitude of the local identification code;

(c) detecting whether said power-up waiting time has expired, and proceeding to step (e) below if such power-up waiting time has expired;

(d) detecting whether a time slot signal has been received on said line and proceeding to step (c) above if such a signal has not been detected, and proceeding to step (i) below if such a signal has been detected;

(e) transmitting a time slot signal incorporating said local identification code on said line;

(f) setting a frame waiting time equal to a standard frame duration for said line;

(g) detecting whether said frame waiting time of step (f) has expired, and proceeding to step (e) if such expiration has occurred;

(h) detecting whether a signal is present on said line, and proceeding to step (g) if no such signal is detected;

(i) reading the identification code from the time slot signal detected on said line;

(j) computing a comparison waiting time period based on the comparison between the identification code read in step (i) and said local identification code;

(k) detecting whether the waiting time set by the step (j) has expired, and proceeding to step (e) if such waiting time has expired; and (l) detecting whether a time slot signal is present on said line, and proceeding to step (k) if no such signal is detected, and proceeding to (i) if such signal is detected.

* * * * *